United States Patent
Davis

(10) Patent No.: US 8,845,277 B2
(45) Date of Patent: Sep. 30, 2014

(54) GEARED TURBOFAN ENGINE WITH INTEGRAL GEAR AND BEARING SUPPORTS

(75) Inventor: Todd A. Davis, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1059 days.

(21) Appl. No.: 12/785,537

(22) Filed: May 24, 2010

(65) Prior Publication Data

US 2011/0286836 A1 Nov. 24, 2011

(51) Int. Cl.
*F01D 25/16* (2006.01)
*F02K 3/06* (2006.01)

(52) U.S. Cl.
CPC . *F01D 25/16* (2013.01); *F02K 3/06* (2013.01); *F05D 2260/4031* (2013.01); *F05D 2240/50* (2013.01)
USPC .......................................................... 415/142

(58) Field of Classification Search
USPC .......... 415/142, 122.1, 124.1, 124.2; 416/160
See application file for complete search history.

(56) References Cited

U.S. PATENT DOCUMENTS

| | | | |
|---|---|---|---|
| 2,862,356 A * | 12/1958 | Kent et al. | 60/791 |
| 2,951,631 A | 9/1960 | Gregory | |
| 2,983,029 A | 5/1961 | Perin et al. | |
| 2,990,784 A | 7/1961 | Wahlmark | |
| 3,133,693 A | 5/1964 | Holl | |
| 3,163,353 A | 12/1964 | Petrie | |
| 3,269,118 A | 8/1966 | Benedict et al. | |
| 3,395,857 A | 8/1968 | Petrie et al. | |
| 3,491,536 A | 1/1970 | Hadaway | |
| 3,494,129 A | 2/1970 | Krebs et al. | |
| 3,505,813 A | 4/1970 | McCathy | |
| 3,534,557 A | 10/1970 | Petrie et al. | |
| 3,536,369 A | 10/1970 | Ainsworth et al. | |
| 3,546,880 A * | 12/1970 | Schwaar | 60/792 |
| 3,602,535 A | 8/1971 | Behning et al. | |
| 3,830,058 A | 8/1974 | Ainsworth | |
| 3,896,757 A | 7/1975 | Kucher | |
| 4,062,186 A | 12/1977 | Snow et al. | |
| 4,135,411 A | 1/1979 | Alessio | |
| 4,201,426 A | 5/1980 | Garten et al. | |
| 4,201,513 A | 5/1980 | Sales | |
| 4,264,272 A | 4/1981 | Weiler | |
| 4,289,360 A | 9/1981 | Zirin | |

(Continued)

FOREIGN PATENT DOCUMENTS

| | | | | |
|---|---|---|---|---|
| DE | 1 051 287 | | 2/1959 | |
| DE | 1051287 | * | 2/1959 | ............. F01D 25/16 |

(Continued)

*Primary Examiner* — Edward Look
*Assistant Examiner* — Jeffrey A Brownson
(74) *Attorney, Agent, or Firm* — Carlson, Gaskey & Olds, P.C.

(57) ABSTRACT

A gas turbine engine includes a bearing and a bearing support having a first wall extending between first and second ends and operatively supported by the bearing at a first end. An engine case is secured to the second end radially outward of the first end. A second wall integral with and extending transversely from the first wall provides a flexible support. The second wall has a flange, and a gear train component is secured to the flange. A gas turbine engine includes a support structure which supports the main rotatable structure via bearings and gear train components. The support provides both the necessary structural support for the rotor structure as well as desired flexibility for a fan drive gear system.

8 Claims, 3 Drawing Sheets

(56) References Cited

U.S. PATENT DOCUMENTS

| | | | |
|---|---|---|---|
| 4,306,755 A | 12/1981 | Roberts | |
| 4,313,712 A | 2/1982 | Briggs | |
| 4,457,667 A * | 7/1984 | Seibert et al. | 415/229 |
| 4,463,994 A | 8/1984 | Eliason et al. | |
| 4,523,864 A | 6/1985 | Walter et al. | |
| 4,573,809 A | 3/1986 | Jacob | |
| 4,578,942 A | 4/1986 | Weiler | |
| 4,598,600 A | 7/1986 | Knowles | |
| 4,683,714 A | 8/1987 | Thebert | |
| 4,744,214 A | 5/1988 | Monsarrat et al. | |
| 4,900,221 A | 2/1990 | Ciokajlo et al. | |
| 4,915,514 A | 4/1990 | Soderlund | |
| 4,916,894 A * | 4/1990 | Adamson et al. | 60/226.1 |
| 4,934,140 A | 6/1990 | Dennison et al. | |
| 5,029,439 A | 7/1991 | Berneuil et al. | |
| 5,154,580 A * | 10/1992 | Hora | 416/129 |
| 5,201,844 A | 4/1993 | Greenwood et al. | |
| 5,237,817 A | 8/1993 | Bornemisza et al. | |
| 5,249,934 A | 10/1993 | Merritt et al. | |
| 5,433,584 A | 7/1995 | Amin et al. | |
| 5,439,750 A * | 8/1995 | Ravenhall et al. | 428/614 |
| 5,791,789 A | 8/1998 | Van Duyn et al. | |
| 5,964,535 A * | 10/1999 | Feinstein et al. | 384/44 |
| 5,974,782 A | 11/1999 | Gerez | |
| 6,009,701 A | 1/2000 | Freeman et al. | |
| 6,109,022 A * | 8/2000 | Allen et al. | 60/223 |
| 6,135,712 A | 10/2000 | Chevrollier et al. | |
| 6,158,210 A | 12/2000 | Orlando | |
| 6,312,215 B1 | 11/2001 | Walker | |
| 6,428,269 B1 | 8/2002 | Boratgis et al. | |
| 6,431,756 B2 | 8/2002 | Maquire et al. | |
| 6,447,248 B1 | 9/2002 | Kastl et al. | |
| 6,619,030 B1 | 9/2003 | Seda et al. | |
| 6,622,473 B2 | 9/2003 | Becquerelle et al. | |
| 6,846,158 B2 | 1/2005 | Hull | |
| 6,877,950 B2 | 4/2005 | Liu | |
| 7,097,412 B2 | 8/2006 | DiTomasso | |
| 7,322,180 B2 | 1/2008 | Lapergue et al. | |
| 7,581,889 B2 | 9/2009 | Bruno et al. | |
| 8,038,386 B2 * | 10/2011 | Duchatelle et al. | 415/122.1 |
| 2002/0069637 A1 | 6/2002 | Becquerelle et al. | |
| 2004/0020186 A1 | 2/2004 | Orlando et al. | |
| 2004/0047731 A1 | 3/2004 | Hull | |
| 2005/0022501 A1 | 2/2005 | Eleftheriou et al. | |
| 2005/0172610 A1 | 8/2005 | Bart et al. | |
| 2005/0221946 A1 * | 10/2005 | Mitrovic | 475/331 |
| 2005/0241290 A1 | 11/2005 | Lapergue et al. | |
| 2005/0276683 A1 | 12/2005 | Lapergue et al. | |
| 2006/0153483 A1 | 7/2006 | Bridges et al. | |
| 2006/0260127 A1 * | 11/2006 | Gekht et al. | 29/889.21 |
| 2007/0006569 A1 | 1/2007 | Brault et al. | |
| 2007/0069596 A1 * | 3/2007 | Hemmi et al. | 310/90 |
| 2008/0173002 A1 * | 7/2008 | Gauthier et al. | 60/39.08 |
| 2010/0154384 A1 * | 6/2010 | Schilling | 60/268 |
| 2010/0218478 A1 * | 9/2010 | Merry et al. | 60/205 |

FOREIGN PATENT DOCUMENTS

| | | |
|---|---|---|
| EP | 0 814 236 | 12/1997 |
| EP | 1 013 896 | 6/2000 |
| FR | 2752024 | 2/1998 |
| GB | 1 556 266 | 11/1979 |

\* cited by examiner

US 8,845,277 B2

GEARED TURBOFAN ENGINE WITH INTEGRAL GEAR AND BEARING SUPPORTS

BACKGROUND

This disclosure relates to a gas turbine engine having a gear train used to drive a fan, and more particularly, the disclosure relates to structure used to support a portion of the gear train relative to a main bearing.

A main bearing is used to rotationally support a compressor rotor and input coupling. In a turbine engine having a gear train, which is used to drive a fan, the same main bearing may be used to rotationally support a gear train component. The gear train component is "soft mounted" to enable the gear train to deflect relative to the main bearing during engine operation. This deflection minimizes gear and bearing stresses by reducing the overall forces exerted within the fan drive system.

In one example arrangement, a main bearing support extends from the main bearing to the engine case. The "soft mount" is provided by a separate flexible structure that includes a steel outer disc that is bolted to the main support where it attaches to the engine case, providing a joint with three flanges. In one example, the main bearing support is constructed from titanium. The flexible support is provided by a stamped steel plate that is welded to a steel inner disc and the outer disc. A torque frame of the gear train is bolted to the inner disc plate.

SUMMARY

A gas turbine engine includes a bearing and a bearing support having a first wall extending between first and second ends and operatively supported by the bearing at a first end. An engine case is secured to the second end radially outward of the first end. A second wall integral with and extending transversely from the first wall provides a flexible support. The second wall has a flange, and a gear train component is secured to the flange.

A method of manufacturing a gas turbine engine includes providing the bearing support having a first wall extending between first and second ends, and a second wall integral with the first wall. An engine case is secured to the second end. A torque frame is secured to a flange provided on the second wall. A bearing is mounted to a centering spring, and the centering spring and bearing are axially inserted through the torque frame. The centering spring is secured to the first end subsequent to the torque frame being secured to the flange.

BRIEF DESCRIPTION OF THE DRAWINGS

The disclosure can be further understood by reference to the following detailed description when considered in connection with the accompanying drawings wherein.

DETAILED DESCRIPTION

Figure 1:
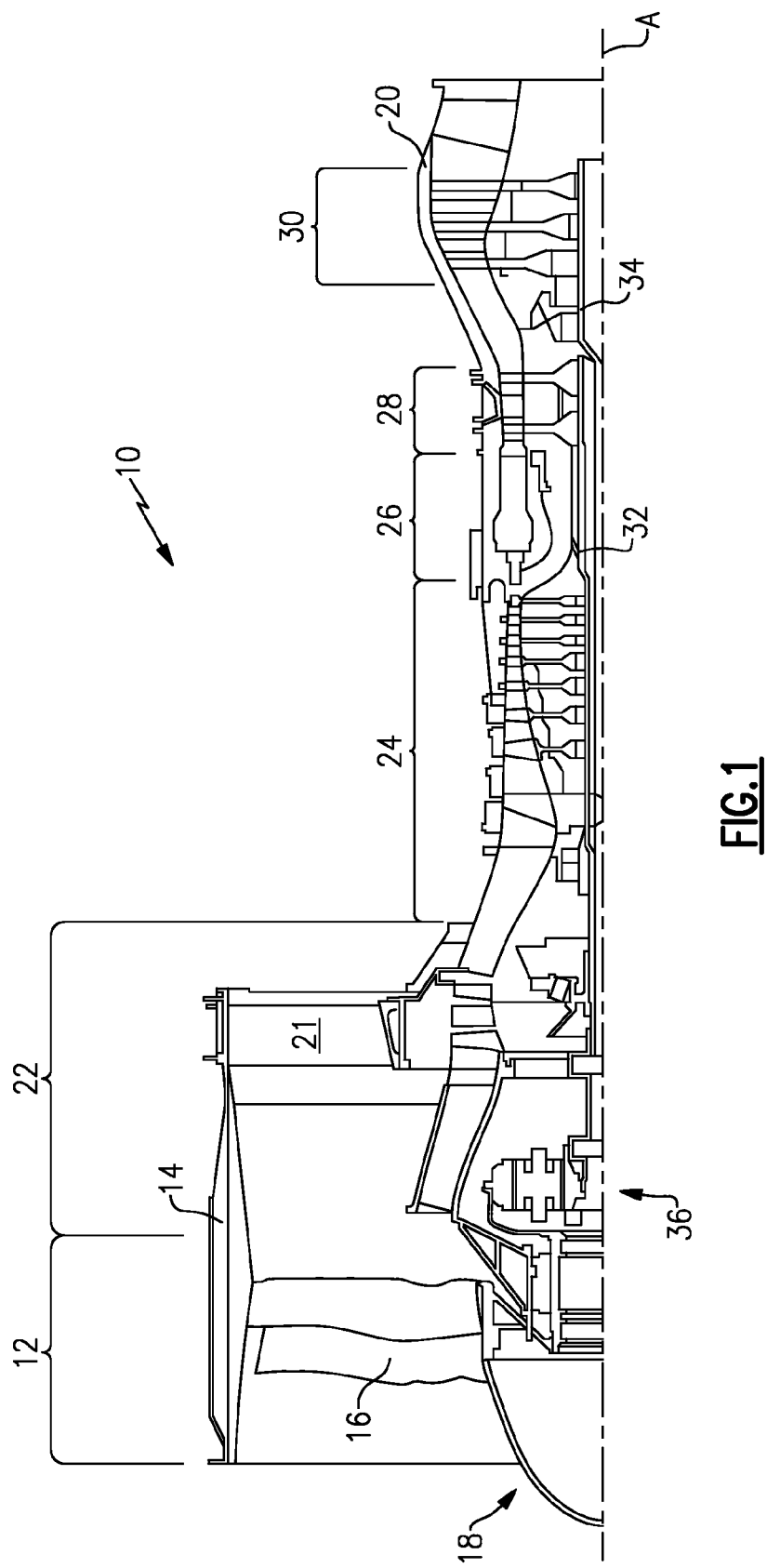
FIG. 1 is a schematic cross-sectional view of an example geared turbofan engine.

A geared turbofan engine 10 is illustrated in a highly schematic fashion in FIG. 1. Engine 10 includes a fan section 12 arranged within a fan case 14. The fan section 12 includes multiple blades arranged at an inlet 18 of the fan case 14. A core 20 is supported relative to the fan case 14 by flow exit guide vanes 21. The core 20 includes a low pressure compressor section 22, a high pressure compressor section 24, a combustor section 26, a high pressure turbine section 28 and a low pressure turbine section 30. In one example, the low pressure compressor section 22 and low pressure turbine section 30 are supported on a low spool 34 rotatable about an axis A. The high pressure compressor section 24 and high pressure turbine section 28 are supported on a high spool 32 rotatable about the axis A.

Figure 2:
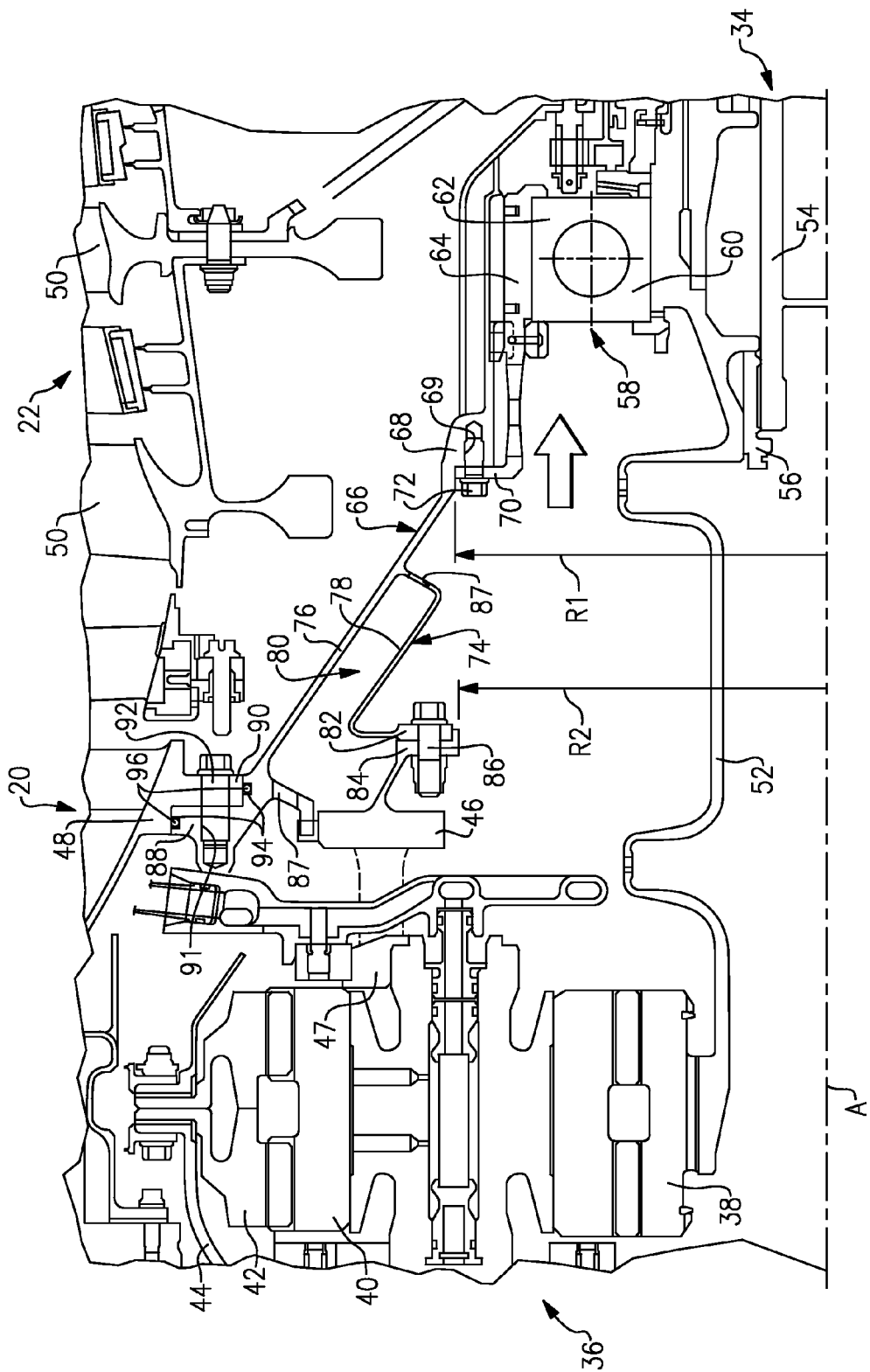
FIG. 2 is an enlarged cross-sectional view of the engine shown in FIG. 1 illustrating one example integrated gear and bearing support.

In the example engine 10, a gear train 36 is arranged between the low spool 34 and the fan section 12 to rotationally drive the fan blades 16 at a desired rotational speed that is lower than the low spool rotational speed. Referring to FIG. 2, the gear train 36 includes an input gear 38 that is operatively coupled to the fan section 12 (shown in FIG. 1). A ring gear 42 is coupled to a member 44, which rotationally drives the fan section 12 via multiple intermediate gears 40 arranged about the input gear 38 and intermeshed with the input gear 38 and the ring gear 42. Other epicyclic gear configurations may be used.

A torque frame 46 is operatively coupled to a case 48 of the core 20 for fixing the intermediate gears 40 against rotation. The torque frame 46 includes fingers that are illustrated by dashed lines in FIGS. 2 and 3. The fingers support a carrier 47 to which the intermediate gears 40 are mounted.

The low spool 34 rotationally drives compressor blades 50 in one or more stages of the low pressure compressor section 22. An input coupling 52 is rotationally supported relative to the low spool 34 by a main bearing 58, which is a ball bearing in one example. The input coupling 52 axially extends from the main bearing 58 to the input gear 38, which is splined to an end of the input coupling 52. The input coupling 52 is mounted to a hub 54, which is part of the low spool 34, and retained thereto by a nut 56.

An inner race 60 of the main bearing 58 is mounted to the input coupling 52, and an outer race 62 of the main bearing 58 is mounted to a centering spring 64. A main bearing support 66, which comprises a portion of the core support structure, is affixed to the centering spring 64. In the example illustrated, the frustoconical main bearing support 66 includes a first support 68 at a first end, and the centering spring 64 includes a centering spring flange 70 that engages the first support 68. In one example, the first support 68 includes a surface having a radius sized to accommodate the centering spring flange 70, which has a first radius R1. Multiple flange fasteners 72 are received in holes 69, secure the centering spring flange 70 to the first support 68.

A flexible support 74 is integral with the main bearing support 66, and are cast or forged from titanium, for example. By "integral" it is meant that the flexible support 74 and main bearing support 66 are permanently affixed to one another, rather than removably affixed such as by fasteners. By "permanently affixed" it is meant that destructive means such as cutting would be required to separate the flexible support 74 and main bearing support 66. The torque frame 46 includes a second flange 84 that is secured to a first flange 82 of the flexible support 74 by fasteners 86. The joint provided by the first and second flanges 82, 84 have a second radius R2 that is large enough to accommodate the centering spring flange 70 (and its first radius R1) during assembly.

The main bearing support 66 includes a first wall 76, and the flexible support 74 includes a second wall 78 that is spaced apart from the first wall 76 to provide a pocket 80. The first and second walls 76, 78 are integral with one another to provide the integrated flexible support 74 and main bearing support 66. Drain holes 87 are provided in at least one of the main bearing support 66 and the flexible support 74 and in communication with the pocket 80 to prevent oil from collecting within the pocket 80 during operation.

The first wall 76 of the main bearing support 66 extends from the first support 68 to a second support 88 at a second end of the main bearing support 66. The case 48 includes a case flange 90 that is secured to the second support 88 with second support fasteners 92 received by holes 91. A recess 94 is provided in one of the main bearing support 66 and the rotor 48. A seal 96 is disposed in the recess 94 to provide a seal between the rotor 48 and the main bearing support 66.

Figure 3:
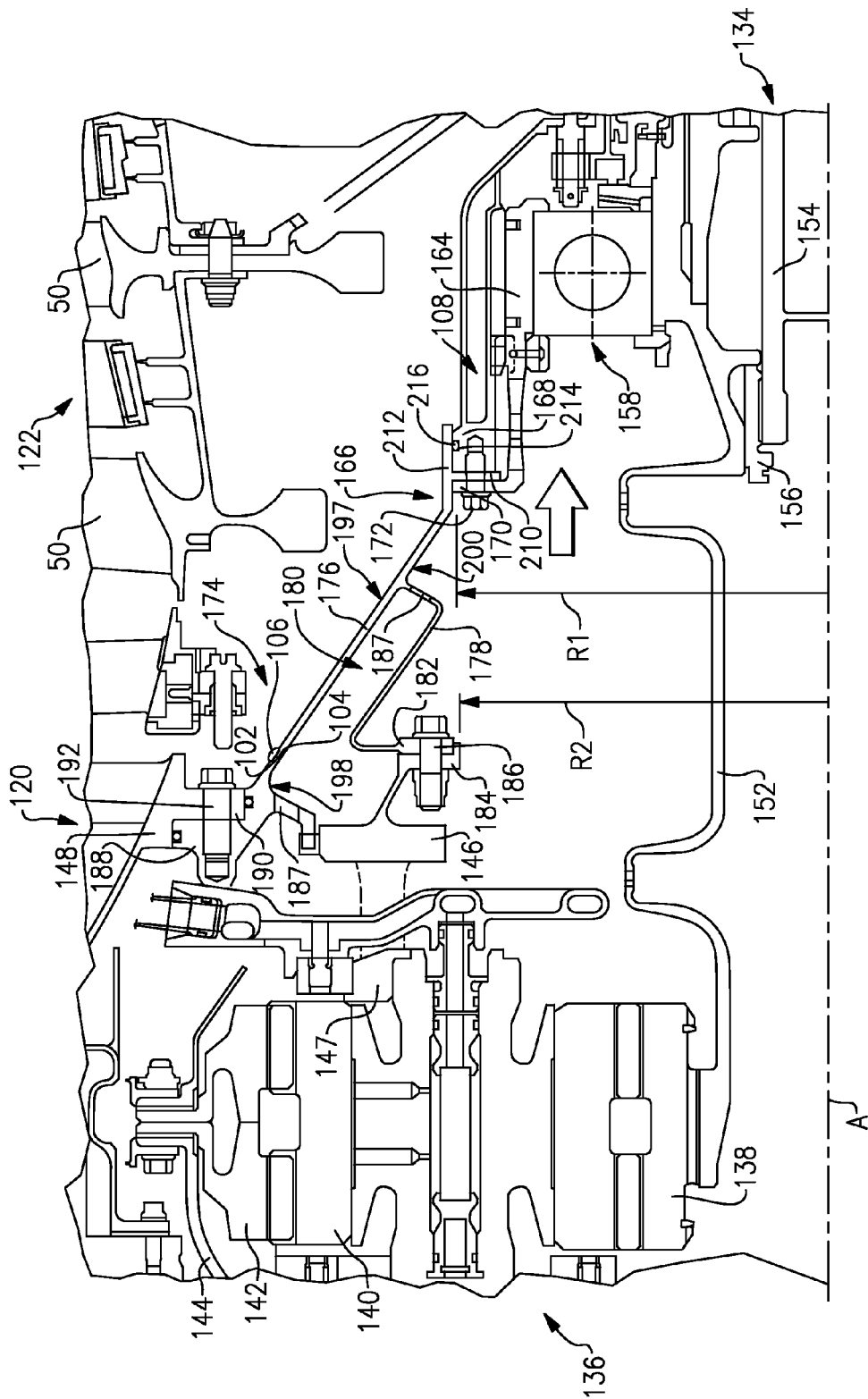
FIG. 3 is an enlarged cross-sectional view of the engine shown in FIG. 1 illustrating another example integrated gear and bearing support.

Another integrated main bearing support 166 and flexible support 174 is shown in FIG. 3. The low pressure compressor section 122 is rotationally driven with the low spool 134 within the core 120. The member 144, mounted to the ring gear 142, is rotationally driven by the input gear 138 via the intermediate gears 140. The intermediate gears 140 are retained in their circumferential position by the carrier 147 and torque frame 146.

The first wall 176 in the example is provided by first and second portions 198, 200. The first and second portions 198, 200, respectively include first and second edges 102, 104 that are secured to one another by a weld 106 or similar manufacturing/affixing method. Providing the first and second portions 198, 200 as two parts enables the pocket 180 to be machined more easily. Machining of the pocket 180 is desirable to obtain the desired wall thickness for the first and/or second walls 176, 178 for balance and strength of the structure in that area. First flange 182 of the second wall 178 is secure to the second flange 184 of the torque frame 146. Forming the first and second walls 176, 178 during a near-net forging operation may avoid the need to machine the pocket 180, for example. The drain holes 187 may be machined or cast, for example.

The main bearing support 166 is provided by an intermediate support 197 and a separate main support 108 that is supported by the main bearing 158 and secured to the centering spring 164. The intermediate support 197 includes an intermediate flange 210 that is mounted to and secured between the main support 108 and the centering spring 164 in the example shown. In one example, the main bearing support 166, flexible support 174 is constructed from titanium and the main support 108 is constructed from aluminum. A nickel alloy may also be used, for example. A seal flange 212 extends from the intermediate support 197. A recess 214 is provided in the main support 108 and receives a seal 216 that engages the seal flange 212.

During assembly, the case flange 190 of the case 148 is secured to the main bearing support 166 at the second support 188 by fasteners 192. The input coupling 152, main bearing 158 and centering spring 164 are assembled to one another. This assembly is installed onto the hub 154 with the main bearing support 166 in place to facilitate assembly, the centering spring 164 outer diameter R1 (and corresponding surface provided by the first support 168) is smaller than the joint inner diameter R2 of the torque frame/first flange joint. The centering spring 164 is secured to the main bearing support 166 with the flange fasteners 172 at the centering spring flange 170 and the input coupling 152 is secured to the hub 154 with the nut 156. The torque frame 146 is secured to the flexible support 174 with the fasteners 186. The gear train 136 is splined or affixed onto the input coupling 152. Assembly of the arrangement illustrated in FIG. 2 is similar to that described above in relation to the arrangement of FIG. 3.

Although an example embodiment has been disclosed, a worker of ordinary skill in this art would recognize that certain modifications would come within the scope of the claims. For that reason, the following claims should be studied to determine their true scope and content.

What is claimed is:

1. A gear train support comprising:
   a frustoconical first wall extending between first and second ends configured to be operatively attached respectively to a main bearing support and an engine case;
   a second wall extending transversely from and integral with a the first wall, a pocket provided between the first and second wall, and a flange provided on the second wall and configured to be operatively attached to a gear train torque frame, wherein at least a portion of the first and second walls are parallel to one another to form the pocket.

2. The gear train support according to claim 1, wherein the second wall intersects the first wall at a location spaced from the first and second ends.

3. The gear train support according to claim 1, wherein the first end provides a first support having a surface having a first radius and configured to accommodate a centering spring, the flange having a second radius larger than the first radius.

4. The gear train support according to claim 1, wherein the first and second ends and the flange each include multiple holes configured to receive fasteners.

5. The gear train support according to claim 1, wherein at least one of the first and second walls within the pocket provide a desired wall thickness for at least one of the first and second walls.

6. The gear train support according to claim 1, wherein the first and second walls are constructed from titanium.

7. The gear train support according to claim 1, comprising a drain hole in the second wall between the flange and the first wall and in communication with the pocket.

8. A gas turbine engine comprising:
   a bearing;
   a bearing support including a first wall extending between first and second ends and operatively supported by the bearing at a first end;
   an engine case secured to the second end radially outward of the first end;
   a flexible support provided by a second wall integral with and extending transversely from the first wall, the second wall having a first flange, wherein at least a portion of the first and second walls are parallel to one another to form a pocket; and
   a gear train component secured to the first flange.

\* \* \* \* \*